United States Patent [19]
Weisbart

[11] 3,835,382
[45] Sept. 10, 1974

[54] VEHICLE PERFORMANCE INDICATOR SYSTEM

[76] Inventor: Emanuel S. Weisbart, 98-40 57th Ave., Lefrak City, N.Y. 11368

[22] Filed: June 29, 1971

[21] Appl. No.: 157,964

[52] U.S. Cl............... 324/161, 324/169, 324/166, 340/263
[51] Int. Cl. ............................................. G01p 3/56
[58] Field of Search............ 324/161, 162, 166–175; 340/263; 235/92 DN, 92 AE; 180/105, 106, 110

[56] References Cited
UNITED STATES PATENTS

| | | | |
|---|---|---|---|
| 2,964,741 | 12/1960 | Freedman............................ | 340/263 |
| 3,525,044 | 8/1970 | Richmond............................ | 324/173 |
| 3,614,617 | 10/1971 | Blake.................................... | 324/166 |

Primary Examiner—Michael J. Lynch
Attorney, Agent, or Firm—Bernard Malina

[57] ABSTRACT

An electronic multi-mode vehicle performance indicator system selectively provides a digital display of odometer, tachometer, speedometer readings as well as other vehicle performance parameters while avoiding the disadvantages of mechanical systems which are subject to frequent breakdown. Provision is made to signal the operator of the vehicle when a preselected maximum vehicle velocity or engine rpm is being exceeded and furthermore to signal the operator when the engine rpm drops below a preset minimum level with the consequent danger of engine stall. Other vehicle parameters such as total elapsed engine revolutions is also displayed.

20 Claims, 7 Drawing Figures

FIG. 1

INVENTOR.
EMANUEL S. WEISBART
BY
Bernard Malina
ATTORNEY

INVENTOR.
EMANUEL S. WEISBART
BY
Bernard Malina
ATTORNEY

VEHICLE PERFORMANCE INDICATOR SYSTEM

BACKGROUND OF THE INVENTION

The present invention relates to vehicle performance indicator systems and more particularly to multi-mode electronic indicator systems which provides a selective digital display of odometer, tachometer, speedometer readings, as well as other vehicle performance parameters.

Presently known speedometers and tachometers such as the type commonly found in parent automobiles and trucks, as well as other surface vehicles, are subject to frequent mechanical breakdown and the resultant large expense for repairs. Thus, the tachometers and speedometers which are mechanically driven habitually require frequent replacement of the drive cables due to breakage. This problem is particularly acute in buses and trucks where the cables extend for a great length from the rear engine to the instrumental panel. In the case of trucks, sharp bends in the cable aggravates the cable breakage problem. Furthermore, the electrical as well as the mechanically-driven ones exhibit readings which are very frequently inaccurate due to the fact that both types depend for their operation on mechanical springs as in the mechanical pointer assembly in the electrical readout display. Such reading inaccuracies are virtually unavoidable in such conventional systems due to the fact that mechanical springs after being subjected to repeated operation inevitably lose some of their original tensile strength thus resulting in an inaccurate position of the indicator needle and hence an erroneous reading.

High resolution conventional readout displays, of necessity, must include large characters and numerals as well as many subdividing lines which results in an unduly large meter face and increases the panel area which is required to accommodate such enlarged instruments. Such increased demand for panel space presents a serious problem since the availability of such space is highly limited. If, in order to meet this problem, the characters and numerals for the readout instrument are confined to a limited area the indicated speed becomes difficult for the vehicle operator to read and, in effect, distracts the driver's attention from the road for an unduly long period of time thereby creating a safety hazard. Furthermore, in order to increase the visibility of the readout to the driver and to maintain alignment of the readout meters with the dirver's eyes it is necessary to locate the readout meter substantially in line with the driver's vision as he is facing forward.

Presently known electrical odometers generally comprise electronic circuits such as oscillators which employ capacitors, resistors and transistors to establish their output frequency. However, in view of the degradation of such electronic components over long periods of time, the stability of the oscillator output frequency deteriorates over such prolonged periods of time. Since most fleet vehicles are scheduled for preventative maintenance service based on the readings of the vehicle odometers or total engine RPM meters, inaccurate registration of these instruments results in premature replacement of materials and unnecessary labor costs. If, on the other hand, the above-mentioned instruments register fewer total mileage or total engine RPM than has actually elapsed, the delayed maintenance resulting thereby very likely leads to costly malfunctions in the vehicle.

Presently known excess indicator systems require the manual adjustment of a sliding control in order to set the desired maximum speed limit which then exceeded will produce an alarm signal. Such manual adjustment by the driver requires his close attention and thus becomes impractical and hazardous when the driver is passing through varying speed zones, and additionally because of the difficulty of aligning the sliding control, the inaccuracy of the desired control setting is frequently considerable.

It is therefore an object of the present invention to provide a vehicle performance indicator system which eliminates the disadvantages and drawbacks of presently known vehicle odometers, tachometers and speedometer instruments.

It is a further object of the present invention to provide a vehicle performance indicator system in the form of a single instrument which selectively provides odometer, total elapsed engine RPM, tachometer and speedometer readings to the vehicle operator requiring a minimum of diversion of the operator's attention from the traffic conditions.

It is yet another object of the present invention to provide a vehicle performance indicator system which because of its multiple instrument function, eliminates multiple stocking problems for vehicle fleet and vehicle manufacturing operations.

Further objects, features and advantages of this invention will become apparent from a consideration of the following description, the appended claims and the accompanying drawings in which:

BRIEF DESCRIPTION OF THE INVENTION

An A.C. generator is linked to the speedometer or tachometer takeoff of an automotive vehicle to produce an A.C. signal which is proportional to the vehicle speed or engine rotational velocity. Whether the apparatus is to be used as a speedometer-odometer system or as a tachometer-total elapsed revolutions counter will determine which of the foregoing two types of takeoffs will be selected. This A.C. generator is linked to the instrument by an electrical cable which applies the generated A.C. signal to a bridge rectifier to convert A.C. signal to a negative-going pulse train, which is amplified and then selectively applied to a total elapsed miles or total elapsed revolutions system. The pulse train is applied to a frequency divider and the output thereof triggers a monostable multivibrator to produce a series of pulses of equal width. These equal width pulses are amplified and applied to an electromechanical impulse counter which thereby registers the total engine revolutions or total number of miles traversed by the vehicle.

The above-mentioned negative-going pulse train is also applied to an instantaneous vehicle speed and engine RPM system having a pulse gate whereby the above-mentioned pulse train appears at the output of the gate whenever a control signal is present at the other input of the gate. This gated pulse train output is applied to a bank of integrated circuit decade counters which are operative to convert a serial pulse train to a four bit BCD numbers. The BCD numbers are transferred from the counters through a bank of latch circuits which are operative to memorize the transferred BCD numbers. After being decoded and reencoded by a bank of BCD decoder driver integrated circuits, the processed signal is applied to a bank of display devices such as numetron, digivac, or nixie devices to thereby display the actual vehicle speed in miles per hour or engine RPM in digital form.

The above-mentioned pulse gate control signal is derived from a bistable latch system which comprises a latch circuit and a pair of time which, by means of generated pulses from the timers' outputs fed to the inputs of the latch, determines the duration of the latch output states. When the countup phase ceases, the counting interval timer fires and the data transfer phase begins and the latch enables the pulse gate to block the transmission of any further pulses, while permitting the transfer of the counted-up numbers to a bank of latch memory circuits which act as memories during this data transfer phase of the latch system.

When the data transfer interval timer fires, the counters are rapidly reset to zero by a pulse generated by the same timer and a new countup phase begins. Furthermore, the latch output controls a blanking and driver gate which drives an excessive speed or excessive engine rotational velocity indicator which glows during the count phase whenever a predetermined speed or engine RPM upper limit is exceeded by the vehicle. Also, an insufficient speed or engine RPM indicator is also controlled by the same latch.

The excess (overspeed) indciator system, in the present invention, comprises a variable decoder which receives BCD data from the output of the above-mentioned decade counters and compares such BCD data to a manually programable encoder switch. Thus, if the BCD number is larger than the programmed number corresponding to the preset speed limit, a pulse is produced at the output of the decoder. This decoder output pulse sets a turn-off delay which allows the blanking and driver gate to illuminate a display device during the count phases of the bistable latch. In the absence of an excess number, a pulse from the data transfer timer output in the latch system turns off the turn-off delay and the driver as well as the driver gate and excess indicator.

The insufficient (underspeed) indicator system informs the operator of the vehicle whenever the engine RPM drops below a preset limit or whenever the vehicle speed falls below a preset value. In operation, BCD data from the decade counters output is applied to a fixed decoder which compares the programmed limit with the actual speed or engine RPM appearing as a BCD number, with the output of the decoder being connected to a turn-off delay. When the BCD number being applied to the decoder is smaller than the programmed number, a pulse is applied to the delay causing it to drive a blanking and driver gate thereby causing the indicator to glow on the count phases of the bistable latch. When BCD data indicates that the vehicle speed exceeds the pre-set limit, pulses from the data transfer timer in the latch system turns off the delay as well as the driver and indicator.

The mode selector switch determines the division ratio of the frequency divider appearing in the total miles or total revolutions system as well as the timing of the bistable latch in the latch system thereby permitting operations of either the speedometer/odometer or tachometer/total elapsed revolutions mode.

DETAILED DESCRIPTION

Figure 1:
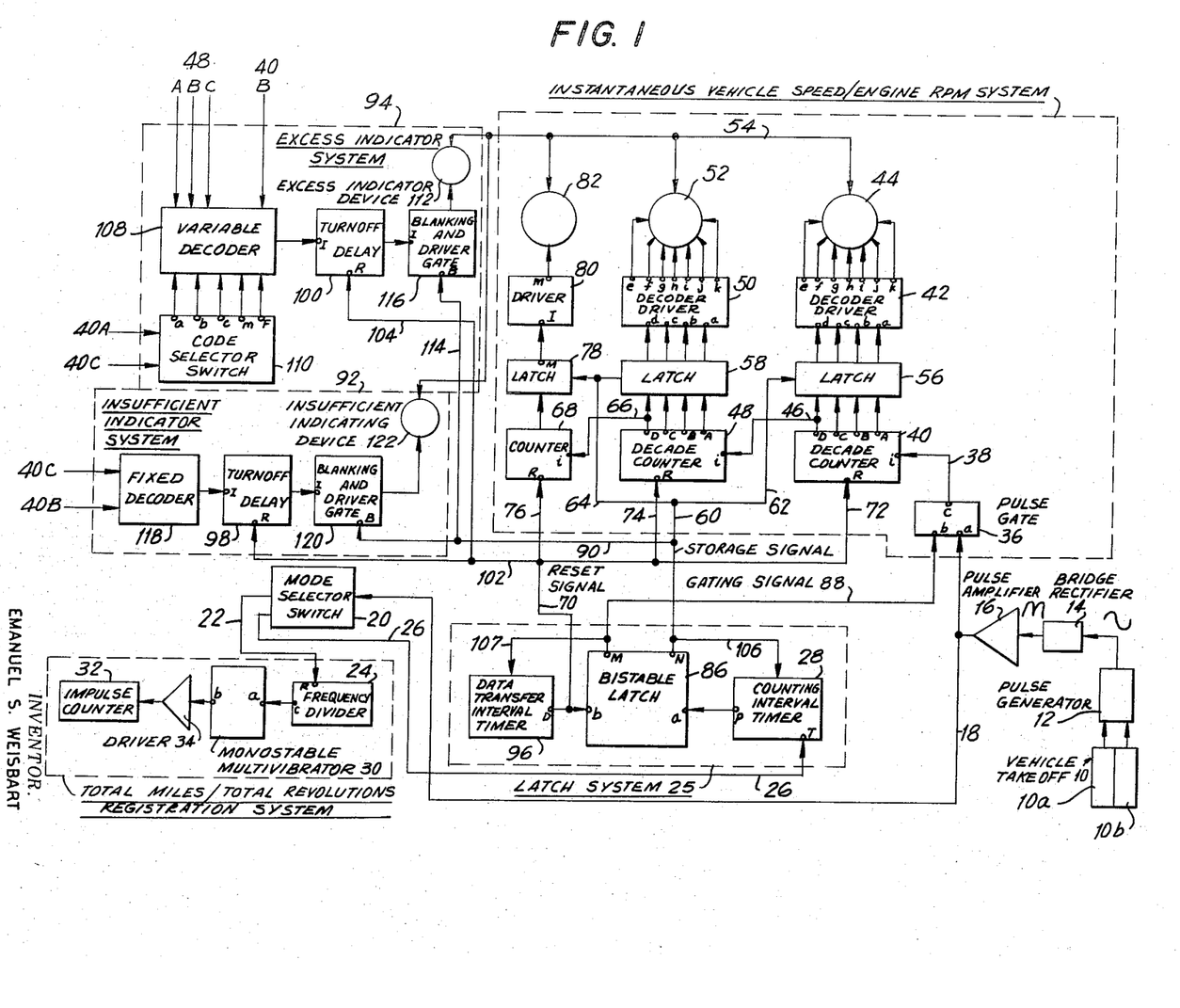
FIG. 1 is a functional block diagram of a vehicle performance system in accordance with the present invention in a preferred embodiment thereof.

Reference is made to the drawings, in particular, to FIG. 1 thereof, which is a functional block diagram of the vehicle performance indicator system of the present invention. Generally speaking, motor vehicles are provided with a vehicle take-off 10 which comprises a speedometer-odometer take-off 10a and in many cases includes an engine tachometer take-off 10b. An AC generator 12 is mechanically connected by means of a shaft coupling with one of the take-offs 10a or 10b to produce an AC output having a frequency which is proportional to the shaft RPM from vehicle take-off 10. In the presently described system, the frequency of the AC output of generator 12 is exactly three times the frequency of revolutions of the shaft output from vehicle take-off 10. The full wave AC output from generator 12 is applied to bridge rectifier circuit 14 which is operative to convert the full wave AC input thereto into a series of rectified pulses i.e., DC pulses with a frequency twice that of the full wave AC input, that is, a pulse frequency six times that of the shaft rotational frequency of the output from vehicle take-off 10. The sinusoidal pulse output from bridge rectifier 14 is applied to pulse amplifier 16, which is operative to amplify and square the input pulses thereto. The squared pulse output of pulse amplifier 16 is utilized, as hereinafter described in greater detail, for both vehicle and engine instantaneous speed and rotation or velocity display system as well as the elapsed miles and elapsed engine revolutions display system. Thus, the pulse train output of pulse amplifier 16 is applied via lead 18 to the input of mode selector switch 20 which is operative to provide a signal output on lead 22 which is applied to frequency divider 24 and a grounded output which is applied via lead 26 to counting interval timer 28 of latch system 25. Frequency divider 24 comprises a plurality of integrated circuit dividers to selectively provide a divide by five, a pair of divide by 10's, and a divide by 6 counters, thereby selectively providing a divide by 600 function and a divide by 3000 function for reasons set forth below.

The divided-down pulse output from frequency divider 24 is applied to monostable multivibrator 30, which produces at its output a pulse train of uniform reduced pulse width in order to insure the proper operation of impulse counter 32 and to avoid ambiguous readings therein which might otherside occur with pulses of larger pulse widths. The output of monostable multivibrator 30 is applied to driver circuit 34 which is operative to amplify the relatively low level pulse output of multivibrator 30 to a level sufficient to properly drive impulse counter 32. Impulse counter 32, which may be of the type readily available commercially, is a digital counter which advances one digit per impulse and has several decades of numbers 0 to 9. Impulse counter 32 may be calibrated so that the first decade reads tenths of a mile, the next significant decade reading miles, etc. In the tachometer-total revolutions mode, the least significant decade may typically be calibrated in terms of 1000 elapsed engine revolutions and thereafter in multiples of 10 for successive decades in counter 32.

In automotive vehicles of the type relevant herein, there is a direct relationship between the actual vehicle distance traveled and the number of shaft revolutions from vehicle take-off 10 and also between the number of engine pretransmission shaft revolutions and the take-off shaft revolutions. Thus, in the speedometer-odometer take-off mode, this ratio is 100 revolutions of the speedometer-odometer shaft 10a for every one tenth of a mile traveled by the vehicle. For the tachometer-total engine revolutions mode 10b, the ratio of the actual number of engine revolutions to the number of take-off revolutions 10b is 2:1. Therefore, in order to register 1000 engine revolutions, take-off shaft 10b must actually turn 500 revolutions.

In the speedometer-odometer mode, 100 take-off 10a shaft revolutions which correspond to one tenth of a mile produces 600 pulses at the input to frequency divider 24. For this mode the divide ratio of frequency divider 24 is 600:1. Therefore, for each one tenth of a mile traversed the pulse appearing at the output of driver 34 will cause the advancement by one digit at impulse counter 32.

In the tachometer-total elapsed engine revolutions mode, each 500 revolutions of take-off shaft 10b which corresponds to 1000 actual engine revolutions will produce 3000 pulses at the input to frequency divider 24. For this mode, frequency divider 24 is set to the ratio of 3000:1. Consequently, for each 1000 revolutions of the engine, impulse counter 32 will advance one digit.

For each revolution of the output shaft from vehicle take-off 10, AC generator 12 produces an electrical waveform of three cycles. As pointed out hereinabove, the output electrical waveform from generator 12 is applied to full wave rectifier 14, and accordingly, the three cycle waveform from generator 12 produces twice as many, i.e., six positive sinusoidal pulses.

Referring now again to the output of pulse amplifier 16, the rectangular pulse output thereof is applied to the input terminal $a$ of pulse gate 36. Pulse gate 36 is also provided with an enabling input terminal $b$ so that the signal applied to terminal $b$ thereof operates to gate, i.e., control the transmission of pulses from input terminal $a$ to output terminal $c$. Thus, for a given gating signal having a given width at input terminal $b$, only a specified number of pulses will be transmitted from input terminal $a$ to output terminal $c$ while the remaining pulses appearing at input terminal $c$ while the remaining pulses appearing at input terminal $a$ will be inhibited i.e., blocked.

The groups of transmitted pulses from output terminal $c$ of pulse gate 36 are applied via lead 38 to input terminal $i$ which is the clock input of BCD decade counter 40. BCD decade counter 40 is in the form of an integrated circuit and is operative to receive serial pulse trains at its input terminal $i$ and to convert such pulses to four line binary coded decimal numbers at its output terminals A, B, C and D. BCD decade counter 40 is operative to store the pulse train information applied at its input until such time as a reset pulse signal appears at input terminal $r$ of decade counter 40.

The output of BCD decade counter 40 at its output terminals A, B, C and D comprises a four bit binary coded decimal number which is fed to a decoder-driver 42 which is operative to decode the aforementioned input signal and to provide an output for driving a numerical display device 44. Decoder-driver 42 may suitably comprise an integrated circuit which is commercially available as a unit and numerical display device 44 may typically comprise a numerical display tube also available commercially.

At output terminal D of decade counter 40 there is applied via lead 46, a carry pulse to input terminal $i$ of the next significant BCD decade counter 48. BCD decade counter 48 is operative, in a manner similar to that described with respect to BCD decade counter 40, to provide a four bit binary coded decimal output at its output terminals A, B, C, and D which are applied to decoder driver 50. Decoder-driver 50 may consist of a BCD to seven segment device similar to decoder-driver 42 previously described. The output of decoder-driver 50, like decoder-driver 42, comprises a seven segment decimal which is applied at its output leads $e, f, g, h, i, j$, and $k$ to the corresponding terminals in numerical display device 52, as indicated, which may suitably comprise a numerical display tube like display tube 44.

Ordinarily, and in the absence of any blanking signal, the numerical display tubes 44 and 52 would exhibit rapidly changing numbers because of the cyclical counting operation taking place. In order to avoid such a confusing constantly changing display of numbers, a four bit latch storage circuit 56 is interposed between the output of BCD decade counter 40 and decoder-driver 42, and similarly, a like four-bit latch storage circuit 58 is interposed between decade counter 48 and decoder-driver 50.

Four-bit latch circuits 56 and 58 are operative to store the last BCD number from decade counters 40 and 48 respectively, while a new sampling is being counted up in counters 40 and 48 respectively. Counter 40, four-bit latch storage circuit 56, and decoder-driver 42 are commercially available in a single integrated circuit unit such as type number HCTRO107 manufactured by Hughes Aircraft Company. Thus, a store signal provided at lead 60 from latch system 25 is applied via leads 62 and 64 to four-bit latch circuits 56 and 58 to effectively disengage the inputs to latch circuits 56 and 58 respectively while a countup is in progress in decade counters 40 and 48 respectively.

The carry output from decade counter 48 at its output terminal D is applied via lead 66 to one-or-nothing counter 68 at input terminal $i$ to thereby extend the range of the system by another order of magnitude of one character, i.e., 0 or 1.

A reset pulse which is derived from latch system 25 at lead 70 and is applied via leads 72, 74 and 76 respectively to counters 40, 48 and 68 respectively. Thus, the reset pulses are provided by latch system 25 occurring at the beginning of each countup cycle for the respective counters 40, 48 and 68 to erase the previously stored countup numbers at the respective counters 40, 48 and 68.

The output of counter 68 is applied to one-bit latch storage circuit 78 whose output in turn is applied to driver gate circuit 80. The output from driver gate circuit 80 at its output terminal m is applied to a one-or-nothing display device 82 such as a commercially available incandescent display tube. Furthermore, the storage signal from latch system 25 is applied via leads 60 and 64 to one-bit latch circuit 78, for the same purpose as mentioned hereinabove with respect to latch circuit 56 and 58.

LATCH SYSTEM 25

Latch system 25 comprises a latch circuit 86 consisting of a bistable multivibrator having a pair of input terminals a and b and a pair of output terminals N and M. System 25 further comprises a counting interval timer 28 which is operative to control the duration of the gating signal to pulse gate 36 appearing on lead 88. Additionally, counting interval timer 28 provides a control signal via output terminal N of bistable latch 86 through lead 90 to effectively control the indicators of INSUFFICIENT (UNDERSPEED) INDICATOR SYSTEM 92 and EXCESS (OVERSPEED) INDICATOR SYSTEM 94, as hereinafter explained in greater detail.

Further provided in latch system 25 is a data-transfer interval timer 96 which is operative to provide at its output terminal D the rest pulses at lead 70, which as pointed out hereinabove, are applied via leads 72, 74 and 76, respectively to counters 40, 48 and 68 as well as to turn-off delay circuits 98 and 100 of indicator systems 92 and 94 respectively via leads 102 and 104 as shown. Thus, the output of counting interval timer 28 at its output terminal P is applied to bistable latch input terminal a of latch circuit 86 while the output of data-transfer interval timer 96 is applied at its output terminal D to the input terminal b of bistable latch circuit 86.

Furthermore, timers 28 and 96 are rendered synchronous by means of feedback line 106 which is connected from output terminal N of bistable latch circuit 86 to counting interval time 28, and also by means of feedback line 107 which is connected from the output terminal M of bistable latch circuit 86 to the input of data-transfer interval timer 96.

EXCESS (OVERSPEED) INDICATOR SYSTEM 94

Excess (overspeed) indicator system 94 receives BCD signals from BCD decade counters 40 and 48 and compares these signals with a manually controlled encoder signals to provide for an indication of excessive vehicle speed or excessive engine RPM as compared to a preselected reference encoded signal. Excess indicator system 94 comprises a variable decoder 108 having a frist set of inputs from terminals A, B and C of BCD decade counter 48 and from output terminal B of decade counter 40 as shown and a code selector switch 110 having inputs from output terminals A and C of decade counter 40. Code selector switch 110 is operative to select the previously mentioned reference encoded signal against which the actual vehicle speed or engine RPM is to be compared with. Thus, code selector switch 110 at its output terminals a, b, c, m and F provide the reference encoded signal to the second set of inputs to variable decoder 108 against which the first mentioned input signals from decade counters 48 and 40 are compared. Thus, variable decoder 108 compares its two sets of inputs, previously mentioned, to produce an output signal whenever the first set of input signals (from terminals A, B and C of counter 48 and terminal B of counter 40) exceed the second set of input signals thereto from code selector switch 110. The excess (overspeed) indicator signal, representing the difference between the first and second set of input signals to variable decoder 108 is applied to input terminal I of turn-off delay circuit 100 which is operative to expand the pulse width of the excess indicator pulse signal and to apply the widened excess indicator signal pulse to blanking and driver gate 116. Gate circuit 116 is operative to amplify the widened excess indicator signal pulse and to apply the same to excess indicator device 112 which may suitably comprise a light-emitting diode or an incandescent numerical display tube having a plus sign inscribed thereon in which the plus sign represents an excess. As shown, a storage signal from latch system 25 via leads 90 and 114 is applied to input terminal B of blanking and driver gate 116 to extinguish indicator device 112 during the data-transfer phase of latch system 25. Turn-off delay circuit 100 is operative to widen the excess indicator signal pulse applied thereto for a sufficiently long time duration to attract the visual attention of the vehicle driver when the indicator device 112 exhibits a visible signal.

INSUFFICIENT (UNDERSPEED) INDICATOR SYSTEM 92

Insufficient (underspeed) indicator system 92 is operative to provide a warning signal when the vehicle speed drops below a pre-selected acceptable level and when the engine RPM drops below a preselected idle or transmission driving speed, and to compare such input signals with a pre-set encoded signal representing the pre-selected idle speed level and to produce an output signal whenever such input signals fall below the preselected pre-set idle speed encoded signal.

Insufficient indicator system 92 comprises a fixed decoder 118 having a pair of inputs from output terminals B and C of decade counter 40. The output signal from fixed decoder 118 is supplied to the input terminal 1 of turn-off delay circuit 98 which is operative to widen the input pulse thereto and to apply the same to blanking and driver gate circuit 120. Blanking and driver gate circuit 120 is operative to amplify the input signal thereto and to apply the same in amplified form to indicator device 122 which, by way of example, may be similar to indicator device 112.

A rest pulse derived from latch system 25 is applied via lead 102 to input terminal R of delay circuit 98 to control the extent to which turn-off delay circuit 98 widens the input pulse thereto. Furthermore, the storage signal from latch system 25 which also serves as a blanking pulse is applied to input terminal B of blanking and driver gate 120.

LATCH SYSTEM 25

Figure 2:
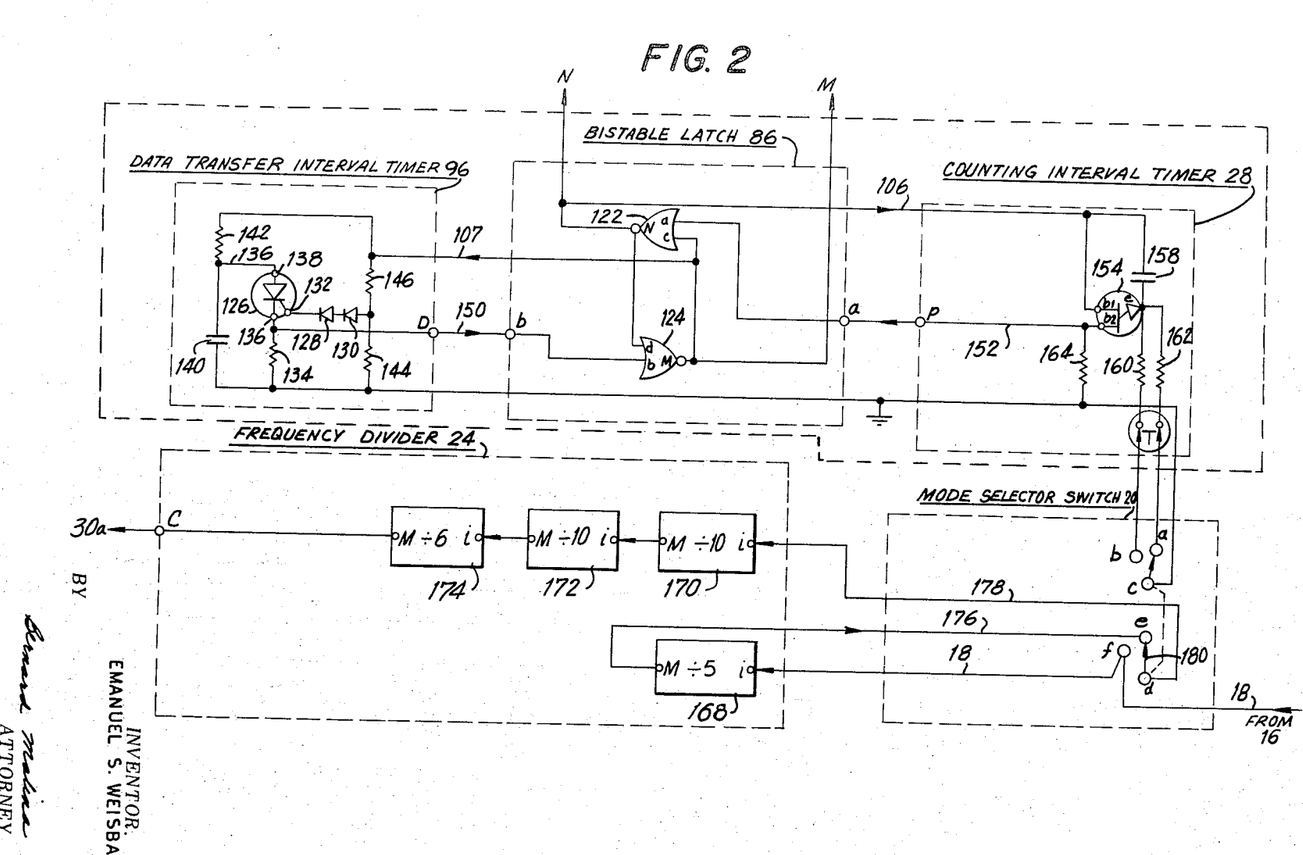
FIG. 2 is a schematic diagram showing in detail the latch system, mode selector switch and frequency divider of FIG. 1.

Referring to FIG. 2, latch system 25 is seen to comprise bistable latch 86, counting interval timer 28 and data transfer interval timer 96. Bistable latch 86 comprises a pair of 2-input NOR gates 122 and 124. NOR gate 122 has a pair of inputs a and c as well as an output N, while NOR gate 124 has a pair of inputs b and d and an output M. As shown, output 122N is connected to input 124d while output 124M is connected to input 122c. In operation, by virtue of the just-mentioned feedback loop connection between NOR gates 122 and 124, the output terminals M and N thereof will always be in opposite states, i.e., if output M is in the 1 state then output N is in the 0 state, and vice versa.

Data transfer interval timer 96 comprises a programmable unijunction transistor 126 having a pair of series diodes 128 and 130 connected to the gate electrode 132 thereof. A resistor 134 is connected between the cathode 136 thereof to ground as shown while the anode 138 is connected to the junction of an RC charging circuit comprising capacitor 140 having one end connected to ground and a charging resistor 142.

Furthermore, a resistor 144 is connected between the anode of diode 130 and ground and a further resistor 146 is connected between the anode of diode 130 and lead 107. The output of unijunction transistor 126 is taken at its cathode terminal which is connected via lead 150 to input b of NOR gate 124 while lead 107 is connected to the junction of input c of NOR gate 122 and output M of NOR gate 124. Resistors 144 and 146 form a resistor divider network which is operative to apply (after a slight drop in voltage across diodes 130 and 128) to gate electrode 132 and thereby set the voltage firing level for unijunction transistor 126.

Diodes 128 and 130 are provided to compensate for temperature variations which affect the firing level of unijunction 126, just mentioned. As pointed out above, lead 107 is a feedback line which runs from output terminal M to charging resistor 142 and programming resistor 146. Thus, when output 124M is in the 0 state the programmable unijunction transistor 126 is inactive. However, when output 124M is at the 1 state voltage is available at lead 107 thereby enabling data transfer interval timer 96 to commence the timing cycle. When unijunction transistor 126 fires it changes the state of output 124M thereby, because of the feedback connection through lead 107, disabling data transfer interval timer 96.

The 0 state of output 124M causes output 122N to switch to the 1 state which provides an enabling voltage for counting interval timer 28 which commences a timing cycle therein. At the end of the timing cycle for counting interval timer 28, a pulse is transmitted via lead 152 to input a of NOR gate 122 thereby causing output 122N to switch to the 0 state and thereby disabling counting interval timer 28 and synchronously recycling data transfer interval timer 96.

Counting interval timer 28 comprises a complementary unijunction transistor 154 having its emitter e connected to a charging circuit comprising charging capacitor 158 and either of charging resistors 160 or 162 as selected by mode selector switch 20. A resistor 164 is connected between the b2 electrode of unijunction transistor 154 while the b1 electrode is connected directly to lead 106.

Counting interval timer circuit 28 comprises an RC controlled pulse generator circuit which functions in a manner similar to that just described with respect to data transfer interval timer 96, with the exception that the temperature compensation and voltage divider components are intrinsic in the complementary unijunction transistor 154 while resistor 164 is suitably chosen to have a resistance value which causes complementary unijunction transistor 154 to compensate for the voltage and temperature effects upon the firing level of unijunction transistor 154. Furthermore, when complementary unijunction transistor 154 fires, current flowing through resistor 164 constitutes a pulse which flows through line 152 to recycle latch system 25. The circuits comprising counting interval timer 28 and data transfer interval timer 96 can readily be interchanged since the required stability depends in part upon the choice of unijunction transistor quality and the use of one type of the mentioned circuits can be duplicated to comprise the necessary timers 28 and 96.

ALTERNATE EMBODIMENT OF COUNTING INTERVAL TIMER 28

In order to attain an extremely high degree of accuracy and stability the instantaneous speed and instantaneous RPM readings, counting interval timer 28 may comprise a tuning fork or crystal controlled oscillator in which the crystal or tuning fork constitutes the time standard and which time standard may be connected between the output and input terminals of an amplifier in a positive feedback arrangement. Here, the output of the oscillator is fed to the clock input of a frequency divider which may be similar to frequency divider 24 wherein a number of cascaded divider stages provide for a total quotient.

In this alternate embodiment, to provide a switchover from instantaneous RPM mode to instantaneous mph mode, terminals y, c, a, and b of mode selector switch 20 are operative to provide differing divide ratios for each mode in a manner similar to the way terminals d, e and f of mode selector switch 20 operate with frequency divider 24, i.e., by selecting the appropriate divider stages to affect a desired divide ratio. Here the output of the last divider stage is connected to a capacitor. The other side of the capacitor is connected to the leads constituting terminal P of counting interval timer 28. The asynchronous reset inputs of the divider stages dividing down the oscillator pulses are connected to terminal N of bistable latch 86.

In operation, whenever output N of bistable latch 86 goes to the 1 level after a pulse from data transfer interval timer 96 is produced, the asynchronous reset inputs of the divider stages are at the 1 level and the frequency divider which derives pulses from the crystal or tuning fork oscillator begin their count-up action. At the end of the count-up action, a pulse becomes produced by the switchover from one state to another, at the output of the frequency divider. This pulse is passed through the DC blocking capacitor connected to the output of the frequency divider. This pulse functions like the pulse produced from unijunction transistor timing interval timer 28, described hereinabove. Thus, the produced pulse brings output N of bistable latch 86 to its 0 level which resets the output of the cascaded counters of the frequency divider to 0 through the asynchronous reset inputs. The 0 level disables the clock input of the frequency divider, and since no count-up operation occurs, no pulse appears at the output of the divider. At this point in time, data transfer interval timer 96 is in the timing mode. At the end of the timing mode the outputs of bistable latch 86 complement and a new cycle begins, so that the frequency divider is again enabled to begin its count-up by virtue of the 1 level applied at its asynchronous reset inputs by output N of bistable latch 86.

MODE SELECTOR SWITCH 20 AND FREQUENCY DIVIDER 24

Referring to FIG. 2, mode selector switch 20 is seen to comprise a commercially available double-pole two-position switch. Mode selector switch 20 is operative to select an appropriate combination of individual counters 168, 170, 172 and 174 which are part of frequency divider 24, previously discussed in general terms. Thus, to have frequency divider 24 provide a divide-by-3000 function, as would be the case in the tachometer mode, the pole $d$ of mode selector switch 20 makes contact with stationary contact $e$ through wiper arm 180 thereby permitting the signal from pulse amplifier 16 via lead 18 to enter divide-by-5 counter 168 at its input terminal $i$. The divided down output from counter 168 is applied at output terminal M via lead 176 through terminal $e$ of mode selector switch 20 and thence via lead 178 to the input terminal $i$ of divide-by-10 counter 170. The divided down output from counter 170 is applied at its output terminal M to the input terminal $i$ of divide-by-10 counter 172 and thence in a similar fashion to divide-by-6 counter 174. Thus, the output pulse train appearing at lead 178 is divided down by a factor of 3000 as compared to the input pulse train appearing on lead 18. As indicated, the divided down pulse output on lead 178 is applied to monostable multivibrator 30.

In order to provide a divide-by-600, as would be required in the odometer-speedometer mode, mode selector switch 20 is switched so that its wiper arm 180 makes contact with switch terminal $f$, whereby the input pulse train on lead 18 passes through lead 178 directly into divide-by-10 counter 170 (by-passing divide-by-5 counter 168) whereby frequency divider 24 provides a divide-by-600 function.

ONE-OR-BLANK COUNTER 68

Figures 3, 5:
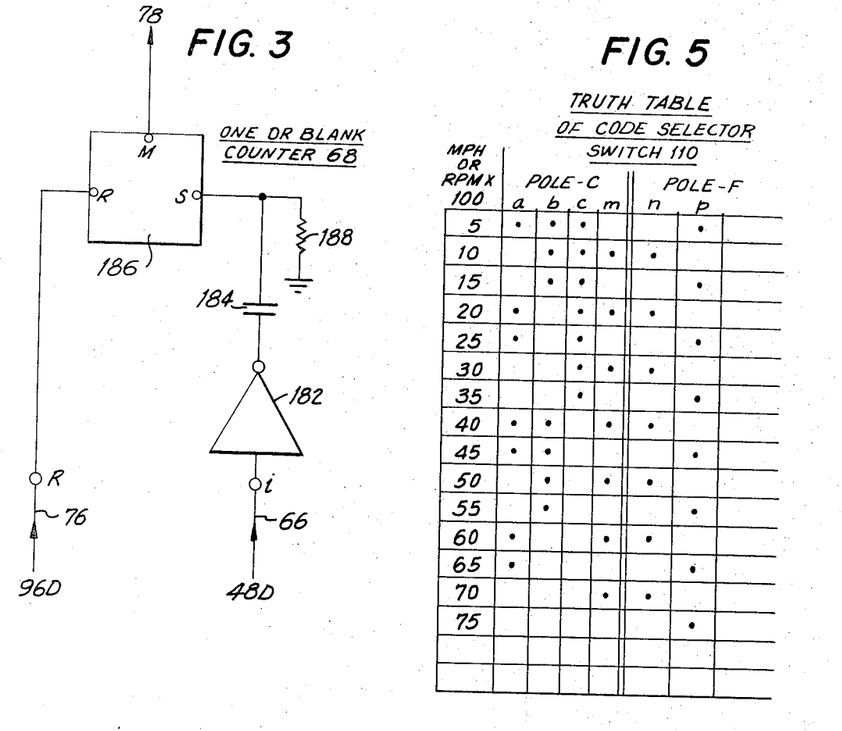
FIG. 3 is a schematic diagram showing in detail the One-or-Blank Counter System of FIG. 1.
FIG. 5 is a Truth Table relating to the Excess and Insufficient (underspeed) Indicator Systems switching sequences of FIGS. 4 and 6.

Referring now to FIG. 3, one-or-blank counter 68 is seen to comprise an inverter 182 having as its input at input terminal $i$ the output of the 10's decade counter, i.e., output terminal D of BCD decade counter 48 via lead 66 which is operative to provide a carry pulse, the positive level of which occurs when counter 48 reaches a BCD number 8. At this point in time, the positive input at input terminal $i$ of inverter 182 produces a zero output at its output terminal. When output terminal D of BCD decade counter 48 switches to the zero state, which occurs after a BCD count of 9 (i.e., $o$), the immediately following count causes the output of inverter 182 to rise to the 1 level, and since positive logic is used herein, a positive pulse is transmitted through capacitor 184 to the input terminal S of bistable multivibrator 186 to thereby set multivibrator 186 to the 1 level to thereby set latch 78 to cause driver 80 to make display device 82 indicate a "1" character. Capacitor 184 is operative to effectively block any DC signal which may appear at the output of inverter 182 and which would otherwise falsely set bistable multivibrator 186.

Resistor 188 which is connected between the junction of capacitor 184 and input terminal S of bistable multivibrator 186 to ground serves to provide a discharge path when the output signal from inverter 182 goes negative, and more importantly, to keep the signal level of input terminal S of bistable multivibrator 186 at zero in the absence of a positive pulse thereat.

The output from terminal D of data transfer interval timer 96 is applied via lead 76 to input terminal R of bistable multivibrator 186 at the beginning of each new count cycle thereby rendering the output of bistable multivibrator 186 appearing at output terminal M zero unless a new carry pulse arrives at input terminal $s$ of bistable multivibrator 186 during the recount.

EXCESS INDICATOR SYSTEM 94

Figure 4:
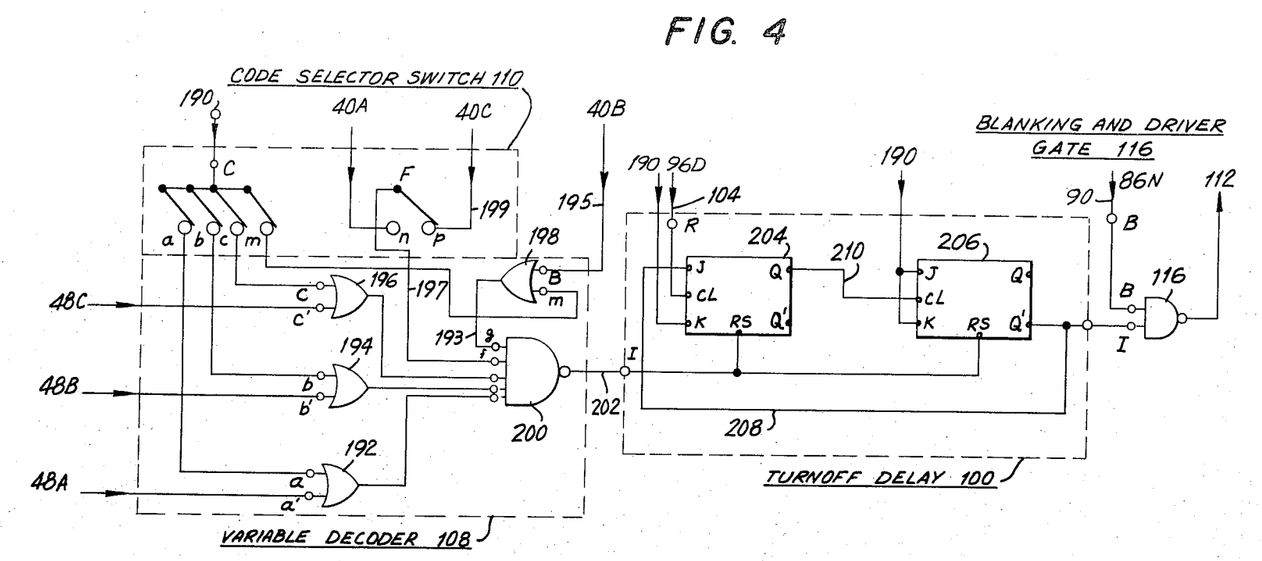
FIG. 4 is a schematic diagram of the Excess (overspeed) Indicator System of FIG. 1.

Referring now to FIG. 4, excess indicator system 94 which is operative to indicate excessive speed or excessive engine RPM, is seen to comprise a code selector switch 110 which is a 10-position, five-pole switch where, as shown, four of the poles thereof are commonly interconnected to a positive voltage terminal 190. Code selector switch 110 may typically be of the thumb-wheel type, which is commercially available. In addition, there are provided fixed contacts $a$, $b$, $c$, and $m$ to which contact is made by the commonly connected four-part wiper assembly C in accordance with the Truth Table in FIG. 5 which represents the speed and RPM limits which are manually preselected. Similarly, pole F of code selector switch 110 makes contact with terminals $n$ and $p$ in accordance with the program indicated in the Truth Table of FIG. 5.

As seen in FIG. 4, the contact terminal $a$, $b$, $c$ and $m$ are respectively connected to the similarly identified input terminals of OR gates 192, 194, 196 and 198. These just-mentioned OR gates may typically comprise the element of an integrated circuit which is commercially available. The respective outputs of the just-mentioned OR gates are respectively applied to the input terminals of 5-input NAND gate 200.

As mentioned, the respective outputs of OR gates 192, 194, 196 and 198 follow the respective inputs thereto as determined by the position of the various contacts of code selector switch 110. In addition to the above-identified input terminals, OR gates 192, 194, 196 and 198 are additionally provided with second input terminals, namely, $a'$, $b'$, $c'$ and B, respectively. Input terminal $c'$ of OR gate 196 is connected to output terminal C of BCD decade counter 48. Input terminal $b'$ of OR gate 194 is connected to output terminal B of BCD decade counter 48, while input terminal $a'$ of OR gate 192 is connected to output terminal A of BCD decade counter 48. As indicated above, inputs $a$, $b$, $c$ and $m$ of OR gates 192, 194, 196 and 198 are effectively present by code selector switch 110 in accordance with a complementary binary coded decimal number which is representative of the most significant decade of the preselected maximum speed or engine RPM.

In operation, whenever the least significant decimal digit of the preselected maximum vehicle speed is zero, terminal $m$ of code selector switch 110 becomes positively biased thereby causing the output of OR gate 198 to which it is connected at its input, to follow its input, i.e., to thereby also become positive. In this mode a BCD 1 appearing at the output terminal A of decade counter 40, and passing through switch pole F and contact $n$ of switch 110 and via lead 197 to input $f$ of NAND gate 200 effectively preset inputs $f$ and $g$ of NAND gate 200. When the remaining inputs to NAND gate 200 receive BCD signals corresponding to an excess in the preselected speed or RPM, all inputs at NAND gate 200 are synchronously at the 1 level. At this time NAND gate 200 produces a negative pulse. When the preselected maximum speed constitutes the number 5 or less in the least significant digit, pole F is set to make contact with contact P of switch 110. It is known that the BCD code for decimal 6 is 0110. In the least significant decade counter 40, its output, terminals B and C are at the 1 level whenever counter 40 instantaneously retains a BCD 6 during a countup period. The 1 level at output C of decade counter 40 appears at input P of NAND gate 200 via lead 199 through contact P and pole F of code selector switch 110 and via lead 197. In addition, the 1 level appearing at output B of counter 40 whenever a BCD 6 appears at the same counter flows through lead 195 thereby appearing at input B of OR gate 198 causing the output of OR gate 198 to reproduce the 1 level appearing at its input, via lead 193 and appearing at input g of NAND gate 200. When the remaining inputs of NAND gate 200 receive the most significant BCD preselected excess signals synchronously with the 1 levels at inputs g and f thereof, NAND gate 200 produces a negative pulse at its output.

As described hereinabove, when the incoming BCD numbers from the respective outputs A, B, D, and D of BCD decade counter 40 and 48 respectively preset the corresponding inputs of NAND gate 200 and the remaining inputs of NAND gate 200 are also similarly preset by code selector switch 110, the output of NAND gate 200 comprises a negative pulse which is applied via lead 202 to the reset input terminal RS of JK flip-flops 204 and 206. Flip-flop 204 like flip-flop 206 may suitably comprise an integrated circuit device which is available commercially. Flip-flops 204 and 206 comprise the turn-off delay 100 which is operative to expand the relatively narrow pulse produced at the output of NAND gate 200 to be applied to the indicator device 112 which may suitably comprise an incandescent lamp, to be energized for a sufficiently long time so as to be visible to the operator of the motor vehicle. Application of the output pulse from NAND gate 200 via lead 202 to input terminals RS which are the overriding asynchronous CLEAR inputs of flip-flops 204 and 206 causes the output terminal Q of flip-flop 204 to go to 0, while causing the output terminal Q of flip-flop 206 to rise to the 1 level. As seen in FIG. 4, the output terminal Q of flip-flop 204 is connected to the clock input terminal CL of flip-flop 206. Output terminal Q' of flip-flop 206 is connected back to input terminal J of flip-flop 204 via lead 208 and is also connected to the input terminal I of driver gate 116.

The JK inputs of flip-flop 206 are jointly connected to a source of positive voltage 190. In addition, input terminal K of flip-flop 204 is also connected to positive voltage source 190. Clock input terminal CL of flip-flop 204 is connected to terminal R which serves as the input to turn-off delay 100, and thence via lead 104 to output terminal D of data-transfer interval timer 96.

When the output at output terminal Q' of flip-flop 206 is at the 1 level, it is operative to preset the input terminal I of driver gate 116. As long as input terminal I of driver gate 116 is at the 1 level, and when the output terminal N of bistable latch 86 is at the 1 level, the simultaneous applications of these 1 levels to both input terminals I and B of driver gate 116 causes the production of a signal at the output of driver gate 116 to illuminate excess indicator device 112. Furthermore, when the output at terminal N of bistable latch 86 goes to 0, the output of driver gate 116 causes excess indicator device 112 to become extinguished.

Because the output at terminal N of bistable latch 86 is alternatively rendered into the 0 and the 1 states, whenever the 1 level appears at input I of driver gate 116 the excess indicator device 112 is caused to alternately flash on and off. As explained hereinabove, this alternate flashing on and off of indicator device 112 has the effect of alerting the operator of the vehicle to the fact that he has exceeded the preselected vehicle speed or engine RPM limits.

When so alerted by the flashing of excess (overspeed) indicator device 112, the vehicle opertor will take the appropriate steps to reduce the vehicle speed and/or engine RPM. Then at the next count-up at decade counters 40 and 48 will cause the output of NAND gate 200 to remain high throughout the count-up cycle (and not to exhibit any negative pulse) to thereby maintain a high (i.e., 1) state at the input terminals RS of flip-flops 204 and 206.

The turn-off operation of delay 100 is as follows. At the end of the data-transfer cycle at latch system 25, data-transfer interval timer 96 at its output terminal D emits a pulse which is applied via lead 104 to the input terminal CL of flip-flop 204. As previously described, the excess signal produced at the output of NAND gate 200 (corresponding to the exceeding of the preselected vehicle speed or engine RPM limit) caused the output at terminal Q' of flip-flop 206 to latch into the 1 state. The 1 state appearing on lead 208 also causes the input terminal J of flip-flop 204 to be rendered into the 1 state while, as mentioned earlier, input terminal K of flip-flop 204 remains at the 1 level because it is connected to a DC positive voltage supply 190.

Flip-flops 204 and 206 are operative such that when their respective inputs RS, J and K are at the 1 level, a pulse going to the 1 level and back to the 0 level causes the output terminals Q and Q' of flip-flops 204 and 206 to complement each other. Flip-flops 204 and 206 are operative such that a negative overriding asynchronous pulse clears output Q to the 0 level while setting output Q' to the 1 level. Thus, the first pulse occurring at the output terminal D of data-transfer interval timer 96 which is applied to input CL of flip-flop 204 via lead 104, now causes the output Q of flip-flop 204 to go to the high (1) state. The 1 output at output terminal Q of flip-flop 204 is applied via lead 210 to the clock input terminal CL of flip-flop 206. Since the Q and Q' outputs of flip-flops 204 and 206 do not change state until a negative-going pulse appears at their respective clock input terminals CL, output Q' of flip-flop 206 still remains at its 1 level. After the application of the above-mentioned first pulse from latch system 25 to the clock input CL of flip-flop 204, output terminal N of bistable latch 86 now goes to the 1 level causing the B terminal of driver gate 116 to go to the 1 level, and since the I input terminal of driver gate 116 is still in the high (1) state, excess indicator device 112 becomes illuminated at this time. At the termination of the present cycle, bistable latch 86 reverses its output states so that data-transfer interval timer 96 once again begins a timing cycle. At the end of this data-transfer timing cycle, a second pulse is produced at output terminal D of data-transfer interval timer 96 which is applied to flip-flop 204 at its clock input CL. This second pulse, once again, causes the Q and Q' outputs of flip-flops 204 and 206 to complement, i.e., the previous 1 level of output terminal Q of flip-flop 204 drops to the 0 level. This negative-going pulse is applied to clock input CL of flip-flop 206 via lead 210 causing the Q and Q' terminals of flip-flop 206 to complement, i.e., causing output terminal Q' to go to the 0 level to thereby disable driver gate 116 and also obtain an extinguished condition for driver gate 116. The 0 level at Q' of flip-flop 206 is applied to input terminal J of flip-flop 204 via lead 208. Flip-flop 204 is operative such that when its J input is low (i.e., 0 state) and its K input is high (i.e., 1 state), a clock pulse applied to clock input CL fo flip-flop 204 causes the output Q of flip-flop 204 to drop to the 0 level, unless terminal Q of flip-flop 204 was previously already at the 0 level. Since the last-mentioned pulse caused terminal Q of flip-flop 204 to go to the 0 level, no change occurs in the state of ouput terminal Q and the 0 level is maintained.

Since lead 210 interconnects terminal Q of flip-flop 204 and clock input terminal CL of flip-flop 204, no change in state occurs at input CL of flip-flop 206 and therefore no change occurs at output Q' of flip-flop 206 as a result. It is therefore apparent that unless an excess pulse is provided at the inputs RS of flip-flops 204 and 206, flip-flops 204 and 206 remain locked in their previously-established states, i.e., output Q' of flip-flop 206 remains at the 0 level, input terminal I of blanking driver gate 116 remains at the 0 state, and the output of driver gate 116 serves to extinguish excess indicator device 112. Output Q' of flip-flop 206 thereafter remains at the 0 level unless and until an excess pulse (corresponding to the exceeding of the preselected vehicle speed or engine RPM) once again arrives at the input terminals RS of flip-flops 204 and 206, thus recycling turn-off delay 100, and once again, making blanking and driver gate 116 illuminate excess indicator device 112 at alternate cycles of bistable latch 86.

INSUFFICIENT INDICATOR SYSTEM 92

Figure 6:
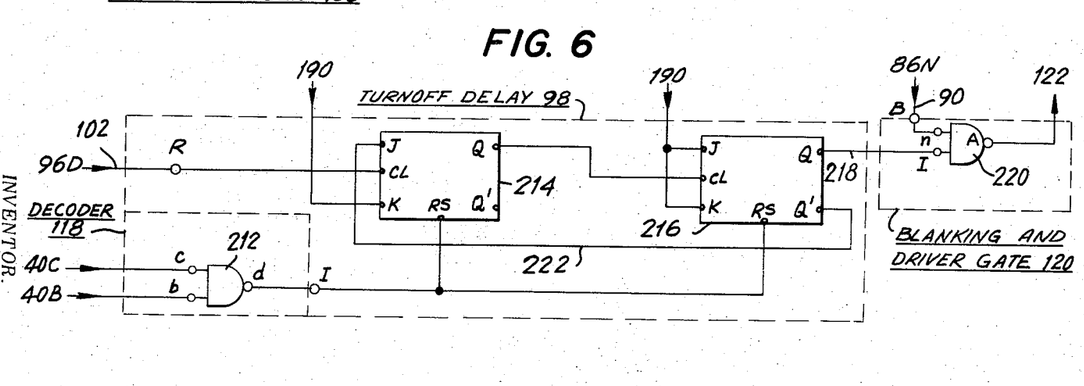
FIG. 6 is a schematic diagram of the Insufficient (underspeed) Indicator System of FIG. 1.

Insufficiently (underspeed) indicator system 92 comprises fixed decoder 118, turn-off delay 98 and blanking and driver gate 120. The BCD decade signals from output terminals B and C of decade counter are respectively applied to the input terminals $b$ and $c$ of NAND gate 212. The number representing a BCD number 5 is 0101 and when this number appears at the output of BCD counter 40 (which is the least significant decade), output terminals B and C of decade counter 40 are simultaneously at the 1 state. When this occurs the output of fixed decoder 212 drops to the 0 state.

Turn-off delay 98 comprises a pair of JK flip-flops 214 and 216 interconnected in a manner similar to that described above with respect to flip-flops 204 and 206, with the exception that the output from flip-flop 216 is taken which is the complement of output terminal Q' of flip-flop 216 at output terminal Q/rather than output terminal Q' as in the case of flip-flop 206.

Thus, a negative pulse occurring at the output of NAND gate 212 whenever the preselected minimum vehicle speed level, which in the present example is 4 miles per hour or 400 RPM is exceeded, is applied to the input terminals RS of flip-flops 214 and 216, thereby causing output Q of both flip-flops 214 and 216 to go to the 0 state. This 0 output of terminal Q of flip-flop 216 is applied via lead 218 to input terminal I of NAND gate 220 causing gate 220 through its output A to extinguish insufficient indicating device 122.

As shown in FIG. 6, turn-off delay 98 serves to expand a narrow pulse applied to its input I. Input K of flip-flop 214 and the terminals J and K of flip-flop 216 are connected to positive DC voltage source 190, terminal CL of flip-flop 214 is connected via lead 102 to the output terminal D of data transfer interval timer 96, output Q of data transfer interval timer 214 is connected to input CL of flip-flop 216 and input J of flip-flop 214 is connected to output Q' of flip-flop 216. The just mentioned connections form a circuit arrangement similar to turn-off delay 100. The Q output of flip-flop 216 is utilized to cause a 0 level to be produced at output Q of flip-flop 216 whenever a negative pulse appears at the RS asynchronous inputs of flip-flops 214 and 216, i.e., whenever the vehicle speed or engine RPM exceeds the preselected minimal level at insufficient indicator system 92.

The 0 level at output Q of flip-flop 216 appears at input I of NAND gate 220 via lead 218 causing insufficient indicating device 122 to be extinguished. So long as the vehicle engine RPM exceeds the preset insufficient level, a negative pulse is produced at the RS inputs of NAND gates 214 and 216 for each countup cycle of decade counter 40 whereby a constant 0 level and output Q of flip-flop 216 is retained thereby maintaining an extinguished state at insufficient indicator device 122. When the vehicle speed or engine RPM falls below the preset insufficient level, BCD data from outputs B and C of decade counter 40 is applied to input $c$ and $b$ of NAND gate 212, corresponding to a numerical level which renders both inputs $c$ and $b$ of decade counter 212 synchronously at the 1 level (i.e., as the preselected threshold level shown in FIG. 5 to be 5 MPH or 500 RPM, that is, when the vehicle speed is below 6 MPH or 600 RPM.

The output $d$ of NAND gate 212 remains continuously at the 1 level thereby maintaining a 1 level at inputs RS of flip-flops 214 and 216 which are asynchronous clear inputs of flip-flops 214 and 216. The 1 level inputs at terminals RS of flip-flops 214 and 216 disable the overriding function of inputs RS thus allowing clock pulses to be applied to input terminal CL of flip-flop 214 thereby causing output Q of flip-flop 216 to rise to a 1 level and to thereby preset input I of NAND gate 220.

In operation, a first pulse generated at output D of data transfer interval timer 96 at the first random cycle of latch sytem 25 is applied to input terminal CL of flip-flop 214 via lead 102. This first pulse causes output Q of flip-flop 214 to rise to the 1 level. This positive step pulse which is applied to input CL of flip-flop 216, however, causes no change in flip-flop 216 at its output terminals Q and Q', i.e., Q remains at the 0 level and Q' remains at the 1 level.

A second pulse subsequent to the just-mentioned first pulse is produced at output terminal D of data transfer interval timer 96 at the termination of the cycle following the above-mentioned first cycle of latch system 25. This second pulse is applied to terminal CL of flip-flop 214 causing output Q thereof to drop to the 0 level due to the complementary nature of flip-flop 214. The negative-going pulse at output Q of flip-flop 214 which is applied to input terminal CL of flip-flop 216 now causes outputs Q and Q' to complement, thus switching output Q to the 1 level and Q' to the 0 level, with the 1 level output at terminal Q is applied to input terminal I of NAND gate 220. Thus at subsequent 1 levels of output N of bistable latch 86, a 1 level is applied to input $n$ of NAND gate 220 via lead 90 causing its output to illuminate insufficient indicating device 122 during subsequent counting interval phases at bistable latch 86.

As mentioned, output Q' of flip-flop 216 has now been effectively polarized to the 0 state. Furthermore, this 0 level signal is applied to input J of flip-flop 214 via lead 222.

Whenever the J input of flip-flop 214 is 0 and its K input is positive (terminal K of flip-flop 214 is continuously at the 1 state by virtue of its connection to positive DC voltage source 190) clock pulses are applied to its terminal CL causing the output terminal Q to remain at 0, if it was previously set to the 0 state. Thus, unless the vehicle engine RPM or velocity exceeds the preset insufficient level thereby recycling turnoff delay 98, inhibiting NAND gate 220 and extinguishing insufficient indicator device 122, clock pulses at input terminal CL of flip-flop 214 are ineffective to change the output Q of flip-flop 214. Accordingly, the static input level at clock input CL of flip-flop 216 is inoperative to change the stable 1 level at output Q of flip-flop 216 thus maintaining a bias at input I of NAND gate 220 permitting NAND gate 220 to illuminate insufficient indicating device 122 at alternate cycles of latch system 25. However, when a reset pulse arrives at the RS input terminals of flip-flops 214 and 216, output Q of flip-flop 216 remains at the 0 level because in order to produce a 1 output, 2 subsequent clock pulses must be present at the CL terminals of flip-flops 214 and 216 while the RS terminal must remain at the 1 level. In other words, no reset pulses may be present at the RS terminals of flip-flops 214 and 216.

Figure 7:
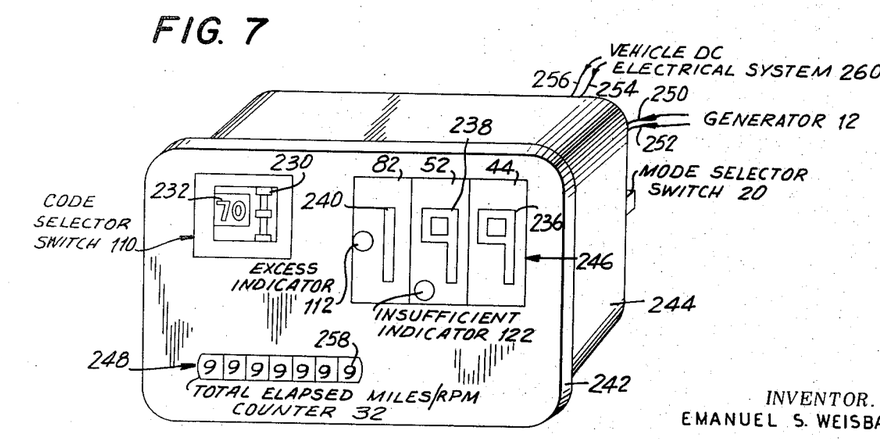
FIG. 7 is a perspective view of the vehicle performance indicator system of the present invention in its housing.

FIG. 7, which is a perspective view of the present vehicle performance indicator apparatus, shows mode selector switch 20 mounted at the rear of a housing 244 which may typically be made of metal or opaque plastic. Housing 244 contains within it all the components shown in FIG. 1 with the exception of pulse generator 12 and vehicle takeoff 10. Attached to the housing is a panel 242 which may suitably be made of material similar to that of housing 244. Panel 242 has cutouts containing visual display devices 82, 52 and 44 as well as elapsed miles/RPM counter 32 as well as the calibrated numerals 232 representing the seleced excess setting a code selector switch 110. Panel 242 is provided with a further cutout for thumbwheel control 230 for code selector switch 110. Thumbwheel 230 protrudes from panel 242 rendering it readily accessible to the vehicle operator.

Code selector switch 110 is of a type commercially available and may be of a type known as series 8000 made by Electronic Engineering Company of California. To protect the built-in components from debris and inadvertent movement of the operator's hand near the vehicle performance indicator apparatus which could damage the instrument, a pair of transparent window covers, 246 and 248 which may typically be made of acrylic or polycarbonate material is attached to the housing panel so as to seal off the cutouts. Additionally, a pair of electrical wires 250 and 252 extend from the vehicle pulse generator located remote from housing 244 (I.E., at vehicle takeoff 10) to the rear of housing 244 and through the terminal extending from the encased circuitry to the outside vicinity of the housing 244.

Additionally, another pair of wires 254 and 256 extend from the vehicle's D.C. electrical power system 260 to terminals at the rear of housing 244 through the walls of housing 244. As explained hereinabove, numerical display devices 44, 52 and 82 are operative to display the illuminated characters which are shown in FIG. 7 which are respectively designated 236, 238 and 240. Excess (overspeed) indicator 112 is the plus sign of numerical display device 82 which insufficient indicator device 122 may typically be the decimal point display of numerical display 52.

In operation, the driver manually sets thumbwheel switch 230 to the desired excess setting indicated by calibration display 232 which is mechanically coupled to the poles of code selector switch 110. When the vehicle exceeds the mentioned setting of code selector switch 110, excess indicator 112 alternately flashes on and off. If the operator passes through a difference maximum speed zone, he merely flips thumbwheel control 230 to the desired new excess limit which is indicated at calibration display 232. If the vehicle speed should fall below the minimum RPM or MPH, depending on whichever mode the apparatus is set to, insufficient (underspeed) indicator 122 alternately flashes on and off. The vehicle speed RPM is continuously displayed by selected illumination of the segmented networks 236, 238 and 240, each network being contained within display devices 44, 52 and 82, respectively. Network 236 represents the 1's characters in the speedometer-odometer code selected by mode selector switch 20. When switch 20 is set in the tachometer total RPM mode network 236 represents 100's of RPM, network 238 represents 1000's of RPM and network 240, tens of 1000's of RPM.

As shown, 7 orders of magnitude are displayed at total elapsed miles per hour RPM counter 32, in which indicator 258 represented one-tenth of a mile or b 1000 RPM depending on the operational mode set by mode selector switch 20, while the remaining six characters to the left each represent progressing orders of magnitudes (i.e., the second character representing unit miles or 10,000 revolutions, the third 10's of miles or 100,000 revolutions, etc.) To switch from the speedometer-odometer mode to the tachometer-total elapsed revolutions mode or vice versa, it is necessary only to flip switch 20 to the desired mode and re-attach generator 12 to the corresponding vehicle takeoff 10a or 10b.

Although the invention has been described with reference to a particular embodiment, it is to be understood that this embodiment is merely illustrated of the application of the principles of the invention. Numerous modifications may be made therein and other arrangements may be devised without departing from the spirit and scope of the invention.

I claim:

1. A vehicle performance indicator system comprising pulse generator means operative for selective connection to the speedometer-odometer and tachometer-total engine revolutions takeoffs of a vehicle and to produce a series of electrical pulses in response to the operation of said vehicle takeoffs, gating means connected to the output of said pulse generator means operative to gate said series of electrical pulses over a preselected time interval, counter means operative to count up and store the numerical value of said gated series pulses and digital display means operative to selectively display said numerical value of said gated pulses representing selectively the instantaneous vehicle velocity when said pulse generator means is connected to said speedomter-odometer takeoff and representing the engine rotational velocity when said pulse generator means is connected to said tachometer-total enginging revolutions takeoff respectively, underspeed comparator means for comparing said numerical value representing the instantaneous vehicle velocity with a preselected minimum desirable vehicle velocity, said underspeed comparator means being operative to produce a vehicle underspeed signal whenever said instantaneous vehicle velocity is below said preselected minimum desirable vehicle velocity, mode selector switch means connected between said pulse generator means and said gating means, including an odometer-total engine revolutions display system comprising a frequency divider for dividing down said series of electrical pulses applied thereto from said pulse generator means said frequency divider having a plurality of inputs representing various frequency division ratios, said mode selector switch means having its input connected to the output of said pulse generator means and its output selectively connected to one of said frequency divider inputs.

2. A vehicle performance indicator system as defined in claim 1, including a monostable multivibrator connected to the output of said frequency divider and operative to produce a series of fixed pulses corresponding to said divided-down series of pulses, and an impulse counter connected between the output of said monostable multivibrator to count-up and continuously display said divided-down series of electrical pulses.

3. A vehicle performance indicator system comprising pulse generator means operative for selective connection to the speedometer-odometer and tachometer-total engine revolutions takeoffs of a vehicle and to produce a series of electrical pulses in response to the operation of said vehicle takeoffs, gating means connected to the output of said pulse generator means operative to gate said series of electrical pulses over a preselected time interval, counter means operative to count up and store the numerical value of said gated series pulses and digital display means operative to selectively display said numerical value of said gated pulses representing selectively the instantaneous vehicle velocity when said pulse generator means is connected to said speedometer-odometer takeoff and representing the engine rotational speed when said pulse generator means is connected to said tachometer-total engine revolutions takeoff respectively, said counter means comprising a one-or-blank counter including an inverter, a flip-flop having an asynchronous set input terminal and an asynchronous reset input terminal and an output terminal and coupling means connecting the output of said inverter and the asynchronous set input terminal of said flip-flop.

4. A vehicle performance indicator system as defined in claim 3 wherein said counter means is operative to produce and store a binary coded decimal number corresponding to the number of electrical pulses applied thereto.

5. A vehicle performance indicator system as defined in claim 4 including decoder means having its input connected to the output of said counter means said decoder, means being operative to convert said binary coded decimal number to a multi-segment decimal number.

6. A vehicle performance indicator system as defined in claim 5 wherein said digital display means comprises at least one numeric display transducer.

7. A vehicle performance indicator system comprising pulse generator means operative for selective connection to the speedometer-odometer and tachometer-total engine revolutions takeoffs of a vehicle and to produce a series of electrical pulses in response to the operation of said vehicle takeoffs, gating means connected to the output of said pulse generator means operative to gate said series of electrical pulses over a preselected time interval, counter means operative to count up and store the numerical value of said gated series pulses and digital display means operative to selectively display said numerical value of said gated pulses representing selectively the instantaneous vehicle velocity when said pulse generator means is connected to said speedometer-odometer takeoff and representing the engine rotational velocity when said pulse generator means is connected to said tachometer-total engine revolutions takeoff respectively, mode selector switch means connected between said pulse generator means and said gating means, said gating means comprising a signal input terminal and gate input terminal, said series of electrical pulses from said pulse generator means being applied to said signal input terminal, said counter means comprising a latch circuit operative to apply a gating signal corresponding to said preselected time interval to said gate input terminal, said latch circuit comprising a bistable latch having first and second input terminals and first and second output terminals, a data transfer interval timer connected between the first output terminal and said first input terminal of said bistable latch, and a counting interval timer having an output terminal connected to the second input terminal of said bistable latch said counting interval timer having a first input terminal connected to the second output terminal of said bistable latch and a second input terminal connected to the output of said mode selector switch, said first output terminal of said bistable latch being connected to said gate input terminal of said gating means.

8. A vehicle performance indicator system as defined in claim 7 wherein said gating means comprises a signal input terminal and a gate input terminal, said series of electricl pulses from said pulse generator means being applied to said signal input terminal, and wherein said counter means comprises a latch circuit operative to apply a gating signal corresponding to said preselected time interval to said gate input terminal.

9. A vehicle performance indicator system as defined in claim 7 wherein said counting interval timer comprises a unijunction transistor.

10. A vehicle performance indicator system as defined in claim 9 wherein said data transfer interval timer comprises a unijunction transistor.

11. A vehicle performance indicator system comprising pulse generator means operative for selective connection to the speedometer-odometer and tachometer-total engine revolutions takeoffs of a vehicle and to produce a series of electrical pulses in response to the operation of said vehicle takeoffs, gating means connected to the output of said pulse generator means operative to gate said series of electrical pulses over a preselected time interval, counter means operative to count up and store the numerical value of said gated series pulses and digital display means operative to selectively display said numerical value of said gated pulses representing selectively the instantaneous vehicle velocity when said pulse generator means is connected to said speedometer-odometer takeoff and representing the engine rotational velocity when said pulse generator means is connected to said tachometer-total engine revolutions takeoff respectively, overspeed comparator means operative to compare said numerical value representing the instantaneous vehicle velocity with a preselected maximum desirable vehicle velocity to produce a vehicle overspeed signal whenever said instantaneous vehicle velocity exceeds said preselected maximum desirable velocity, and vehicle overspeed indicator display means connected to said overspeed comparator means to provide an indication of the vehicle overspeed, said counter means being operative to produce and store a binary coded decimal number corresponding to the number of electrical pulses applied thereto and said overspeed comparator means comprising a variable decoder having first and second sets of input terminals said binary coded decimal number from said counter means being applied to said first set of decoder input terminals, and a code selector switch having its inputs connected to said counter means and its outputs connected to said second set of input terminals of said variable decoder said variable decoder being operative to produce a pulse indicating the exceeding of said maximum desirable vehicle velocity, including a turnoff delay circuit connected to the output of said variable decoder being operative to widen said variable decoder pulse, including a blanking and driver gate operative to selectively produce an intermittent vehicle overspeed signal.

12. A vehicle performance indicator system as defined in claim 11 wherein said variable decoder comprises a NAND gate having a plurality of inputs, a plurality of OR gates each having a plurality of inputs, one of said OR gate inputs connected to said code selector switch and at least one other OR gate input connected to said counter means, the output of each of said OR gates being connected to an input terminal of said NAND gate respectively, and the output of said NAND gate being connected to said turnoff delay.

13. A vehicle performance indicator system as defined in claim 12 wherein said turnoff delay comprises a pair of flip-flops connected in composite bistable arrangement.

14. A vehicle performance indicator system comprising pulse generator means operative for selective connection to the speedometer-odometer and tachometer-total engine revolutions takeoffs of a vehicle and to produce a series of electrical pulses in response to the operation of said vehicle takeoffs, gating means connected to the output of said pulse generator means operative to gate said series of electrical pulses over a preselected time interval, counter means operative to count-up and store the numerical value of said gated series pulses and digital display means operative to selectively display said numerical value of said gated pulses representing selectively the instantaneous vehicle velocity when said pulse generator means is connected to said speedometer-odometer takeoff and representing the engine rotational speed when said pulse generator means is connected to said tachometer-total engine revolutions takeoff respectively, overspeed comparator means for comparing the instantaneous engine rotational speed with a preselected maximum desirable engine rotational speed and to produce an engine overspeed signal whenever said instantaneous engine speed exceeds said preselected maximum desirable engine speed, and overspeed indicator means connected to said overspeed comparator means to provide an indication of the engine overspeed, said counter means being operative to produce and store a binary coded decimal number corresponding to the number of electrical pulses applied thereto and said excess engine comparator means comprises a variable decoder having first and second sets of input termials said binary coded decimal number from said counter means being applied to said first set of decoder input terminals, and a code selector switch having its inputs connected to said counter means and its outputs connected to said second set of input terminals of said variable decoder, said variable decoder being operative to produce a pulse indicating the exceeding of said maximum desirable vehicle velocity, including a turnoff delay circuit connected to the output of said variable decoder being operative to widen said variable decoder pulse, including a blanking and driver gate operative to selectively produce an intermittent excess engine speed signal.

15. A vehicle performance indicator system as defined in claim 14 wherein said variable decoder comprises a NAND gate having a plurality of inputs, a plurality of OR gates each having a plurality of inputs, one of said OR gate inputs connected to said code selector switch and at least one other OR gate input connected to aid counter means, the output of each of said OR gates being connected to an input terminal of said NAND gate respectively, and the output of said NAND gate being connected to said turnoff delay.

16. A vehicle performance indicator system as defined in claim 15 wherein said turnoff delay comprises a pair of flip-flops connected in composite bistable arrangement.

17. A vehicle performance indicator system comprising pulse generator means operative for selective connection to the speedometer-odometer and tachometer-total engine revolutions takeoffs of a vehicle and to produce a series of electrical pulses in response to the operation of said vehicle takeoffs, gating means connected to the output of said pulse generator means operative to gate said series of electrical pulses over a preselected time interval, counter means operative to count up and store the numerical vlaue of said gated series pulses and digital display means operative to selectively display said numerical value of said gated pulses representing selectively the instantaneous vehicle velocity when said pulse generator means is connected to said speedometer-odometer takeoff and representing the engine rotational velocity when said pulse generator means is connected to said tachometer-total engine revolutions takeoff respectively, including underspeed comparator means for comparing said numerical value representing the instantaneous vehicle velocity with a preselected minimum desirable vehicle velocity, said underspeed comparator means being operative to produce a vehicle underspeed signal whenever said instantaneous vehicle velocity is below said preselected minimum desirable vehicle velocity, and underspeed indicator means connected to said underspeed comparator means and operative to provide an indication of the vehicle underspeed, said counter means being operative to produce and store a binary coded decimal number corresponding to the number of electrical pulses applied thereto and said insufficient comparator means comprises a decoder having first and second sets of input terminals said binary coded decimal number from said counter means being applied to said first set of decoder input terminals, and a code selector switch having its inputs connected to said counter means and its outputs connected to said second set of input terminals of said decoder, said decoder being operative to produce a pulse to indicate that the instantaneous vehicle speed is below the preselected minimum vehicle velocity, including a turnoff delay circuit connected to the output of said decoder being operative to widen said decoder pulse, including a blanking and driver gate operative to selectively produce an intermittent vehicle underspeed signal.

18. A vehicle performance indicator system as defined in claim 17 wherein said turnoff delay comprises a pair of flip-flops connected in composite bistable arrangement.

19. A vehicle performance indicator system comprising pulse generator means operative for selective connection to the speedometer-odometer and tachometer-total engine revolutions takeoffs of a vehicle and to produce a series of electrical pulses in response to the operation of said vehicle takeoffs, gating means connected to the output of said pulse generator means operative to gate said series of electrical pulses over a preselected time interval, counter means operative to count up and store the numerical value of said gated series pulses and digital display means operative to selectively display said numerical value of said gated pulses representing selectively the instantaneous vehicle velocity when said pulse generator means is connected to said speedometer-odometer takeoff and representing the engine rotational speed when said pulse generator means is connected to said tachometer-total engine revolutions takeoff respectively, including underspeed comparator means for comparing said numerical value representing the instantaneous engine rotational speed with a preselected minimum desirable engine speed, said underspeed comparator means being operative to produce an engine underspeed signal whenever said instantaneous engine speed is below said preselected minimum desirable engine speed, and underspeed indicator means connected to said underspeed comparator means and operative to provide an indication of the engine underspeed, said counter means being operative to produce and store a binary coded decimal number corresponding to the number of electrical pulses applied thereto and said underspeed comparator means comprises a decoder having first and second sets of input terminals, said binary coded decimal number from said counter means being applied to said first set of decoder input terminals, and a code selector switch having its inputs connected to said counter means and its outputs connected to said second set of input terminals of said decoder, said decoder being operative to produce a pulse to indicate that the instantaneous engine speed is below the preselected minimum engine speed, including a turnoff delay circuit connected to the output of said decoder being operative to widen said decoder pulse, including a blanking and driver gate operative to selectively produce an intermittent insufficient engine underspeed signal.

20. A vehicle performance indicator system as defined in claim 19 wherein said turnoff delay comprises a pair of flip-flops connected in composite bistable arrangement.

* * * * *